United States Patent
Deng et al.

(10) Patent No.: US 11,360,625 B2
(45) Date of Patent: Jun. 14, 2022

(54) DISPLAY DEVICE AND TERMINAL

(71) Applicant: WUHAN CHINA STAR OPTOELECTRONICS SEMICONDUCTOR DISPLAY TECHNOLOGY CO., LTD., Wuhan (CN)

(72) Inventors: Yichao Deng, Wuhan (CN); Jian Ye, Wuhan (CN)

(*) Notice: Subject to any disclaimer, the term of this patent is extended or adjusted under 35 U.S.C. 154(b) by 150 days.

(21) Appl. No.: 16/753,812

(22) PCT Filed: Jan. 2, 2020

(86) PCT No.: PCT/CN2020/070154
§ 371 (c)(1),
(2) Date: Apr. 6, 2020

(87) PCT Pub. No.: WO2021/062965
PCT Pub. Date: Apr. 8, 2021

(65) Prior Publication Data
US 2021/0405815 A1    Dec. 30, 2021

(30) Foreign Application Priority Data

Sep. 30, 2019   (CN) .......................... 201910938733.2

(51) Int. Cl.
*G06F 3/044*   (2006.01)
*G06F 3/041*   (2006.01)

(52) U.S. Cl.
CPC .......... *G06F 3/0446* (2019.05); *G06F 3/0412* (2013.01); *G06F 3/04164* (2019.05); *G06F 2203/04111* (2013.01)

(58) Field of Classification Search
CPC .. G06F 3/0446; G06F 3/04164; G06F 3/0412; G06F 2203/04111
See application file for complete search history.

(56) References Cited

U.S. PATENT DOCUMENTS

| | | | |
|---|---|---|---|
| 10,768,763 B2 * | 9/2020 | Liu | G06F 3/0443 |
| 2019/0004638 A1 | 1/2019 | Lee et al. | |
| 2020/0133435 A1 * | 4/2020 | Liu | G06F 3/0443 |
| 2020/0273919 A1 | 8/2020 | Ding et al. | |
| 2021/0151516 A1 * | 5/2021 | Ding | H01L 27/323 |

FOREIGN PATENT DOCUMENTS

| | | |
|---|---|---|
| CN | 109144330 A | 1/2019 |
| CN | 109901747 A | 6/2019 |

* cited by examiner

*Primary Examiner* — Peter D McLoone

(57) ABSTRACT

The disclosure provides a display device and a terminal. The display device includes a display panel, a touch layer, a detecting circuit, and a connecting line. The display panel includes a display area, a first through hole, and a buffer area. The touch layer is provided with a plurality of touch electrodes, and a second through hole is defined in an area of the touch layer corresponding to the first through hole. The detecting circuit is disposed in the buffer area and is configured to detect quality of the first through hole. The connecting line is formed in the touch layer and is configured to connect the detecting circuit to an external circuit. Quality of an area of the display panel where a hole is defined is detected.

16 Claims, 2 Drawing Sheets

DISPLAY DEVICE AND TERMINAL

FIELD

The present disclosure relates to the field of display technologies and more particularly, relates to a display device and a terminal.

BACKGROUND

With development of full-screen panel technologies, disposing electronic components, such as camera lenses, under a display panel has become a growing trend. Correspondingly, a hole must be defined on the display panel. However, an area where the hole is defined is prone to destructive defects such as damage and cracks, resulting in panel failure. If later processes of the display panel proceed, product yield will be affected.

Consequently, in conventional display panels, quality of the drilling area has technical problems that need to be detected and improved.

SUMMARY

The present disclosure provides a display device and a terminal to alleviate a technical problem that quality of an area where a hole is defined needs to be detected.

To solve the above problem, technical solutions provided by the present disclosure are described below.

The present disclosure provides a display device, including:

a display panel including a display area and an electronic component area where a plurality of electronic components are correspondingly disposed, the electronic component area includes a first through hole and a buffer area, and the buffer area surrounds the first through hole and is in contact with the display area;

a touch layer, wherein the touch layer is provided with a touch electrode, and a second through hole is defined in an area of the touch layer corresponding to the first through hole;

a detecting circuit, wherein the detecting circuit is disposed in the buffer area and is configured to detect quality of the first through hole in the display panel; and a connecting line, wherein the connecting line is formed in the touch layer and is configured to connect the detecting circuit to an external circuit.

In the display device provided by the present disclosure, the touch electrode includes a first touch electrode and a second touch electrode, the touch layer includes a first touch layer and a second touch layer which are stacked, the first touch layer is provided with a plurality of first touch electrode chains arranged along a first direction and a plurality of second touch electrode chains arranged along a second direction, and the first direction is perpendicular to the second direction. The first touch electrode chains include the plurality first touch electrodes connecting with each other, the second touch electrode chains include the plurality of second touch electrodes independent from each other, the second electrode layer is provided with a plurality of connecting bridges, two adjacent second touch electrodes are connected by the connecting bridges in the second touch electrode chains, and the connecting line is formed in at least one of the first touch layer or the second touch layer.

In the display device provided by the present disclosure, the connecting line is correspondingly disposed with respect to at least one of the first touch electrode or the second touch electrode.

In the display device provided by the present disclosure, the first touch electrode and the second touch electrode are grid shaped, the first touch electrode includes a plurality of first electrode lines arranged in a criss-cross manner, the first electrode lines encircle a plurality of first virtual units, the second touch control includes a plurality of second electrode lines arranged in a criss-cross manner, the second electrode lines encircle a plurality of second virtual units, the connecting line is connected to the external circuit by at least one of the first virtual units or the second virtual units.

In the display device provided by the present disclosure, the connecting line is a polyline or a straight line.

In the display device provided by the present disclosure, a material of the connecting line is same as materials of the first electrode lines and the second electrode lines.

In the display device provided by the present disclosure, the material of the connecting line is at least one of indium tin oxide, nanosilver, or carbon nanotubes.

In the display device provided by the present disclosure, the material of the connecting line is at least one of a Ti/Al/Ti stacked layer, a Ti/Cu/Ti stacked layer, a Mo/Al/Mo stacked layer, or a Mo/Cu/Mo stacked layer.

In the display device provided by the present disclosure, the connecting line includes a first connecting line and a second connecting line independent from each other, and the detecting circuit is disposed around the first through hole and is connected to the external circuit by the first connecting line and the second connecting line.

In the display device provided by the present disclosure, in the buffer area, the second touch layer is provided with a first conduction line disposed around the detecting circuit, the first conduction line includes a first touch electrode conduction line and a second touch electrode conduction line, a plurality of first electrode lines of the first touch electrode disconnected by the buffer area are reconnected by the first touch electrode conduction line, and a plurality of second electrode lines of the second touch electrode disconnected by the buffer area are reconnected by the second touch electrode conduction line.

In the display device provided by the present disclosure, a material of the first conduction line is same as materials of the first electrode lines and the second electrode lines.

In the display device provided by the present disclosure, in the buffer area, the second touch layer is further provided with a second conduction line located between the first conduction line and the detecting circuit, a first virtual unit disconnected by the buffer area is reconnected by the second conduction line, and a second virtual unit disconnected by the buffer area is reconnected by the second conduction line.

In the display device provided by the present disclosure, a material of the second conduction line is same as materials of the first virtual unit and the second virtual unit.

In the display device provided by the present disclosure, the touch layer includes a first edge and a second edge which are parallel to the first direction, and a third edge and a fourth edge which are parallel to the second direction. The display device further includes an electrode signal line disposed along an edge of the touch layer, the electrode signal line includes a first electrode signal line, a second electrode signal line, and a third signal line. The first electrode signal line is disposed along the first edge and the fourth edge and is connected to the first touch electrode chains at the first edge, the second electrode signal line is disposed along the second edge and is connected to the first touch electrode chains, the third electrode signal line is disposed along the third edge and is connected to the second touch electrode chains, and the first electrode signal line, the second electrode signal line, and the third electrode signal line are respectively connected to a signal terminal at the second edge.

In the display device provided by the present disclosure, a material of the electrode signal line is same as materials of the first electrode lines and the second electrode lines.

The present disclosure further provides a terminal, including a display device; wherein the display device includes:

a display panel including a display area and an electronic component area where a plurality of electronic components are correspondingly disposed, the electronic component area includes a first through hole and a buffer area, and the buffer area surrounds the first through hole and is in contact with the display area;

a touch layer, wherein the touch layer is provided with a touch electrode, and a second through hole is defined in an area of the touch layer corresponding to the first through hole;

a detecting circuit, wherein the detecting circuit is disposed in the buffer area and is configured to detect quality of the first through hole in the display panel; and a connecting line, wherein the connecting line is formed in the touch layer and is configured to connect the detecting circuit to an external circuit.

In the terminal provided by the present disclosure, the touch electrode includes a first touch electrode and a second touch electrode. The touch layer includes a first touch layer and a second touch layer which are stacked, the first touch layer is provided with a plurality of first touch electrode chains arranged along a first direction and a plurality of second touch electrode chains arranged along a second direction, and the first direction is perpendicular to the second direction. The first touch electrode chains include the plurality first touch electrodes connecting with each other, the second touch electrode chains include the plurality of second touch electrodes independent from each other, the second electrode layer is provided with a plurality of connecting bridges, two adjacent second touch electrodes are connected by the connecting bridges in the second touch electrode chains, and the connecting line is formed in at least one of the first touch layer or the second touch layer.

In the terminal provided by the present disclosure, the connecting line is correspondingly disposed with respect to at least one of the first touch electrode or the second touch electrode.

In the terminal provided by the present disclosure, the first touch electrode and the second touch electrode are grid shaped, the first touch electrode includes a plurality of first electrode lines arranged in a criss-cross manner, the first electrode lines encircle a plurality of first virtual units, the second touch control includes a plurality of second electrode lines arranged in a criss-cross manner, the second electrode lines encircle a plurality of second virtual units, and the connecting line is connected to the external circuit by at least one of the first virtual units or the second virtual units.

In the terminal provided by the present disclosure, the connecting line is a polyline or a straight line.

Regarding the beneficial effects: the present disclosure provides a display device and a terminal. The display device includes a display panel, a touch layer, a detecting circuit, and a connecting line. The display panel includes a display area and an electronic component area where a plurality of electronic components are correspondingly disposed. The electronic component area includes a first through hole and a buffer area, and the buffer area surrounds the first through hole and is in contact with the display area. The touch layer is provided with a touch electrode, and a second through hole is defined in an area of the touch layer corresponding to the first through hole. The detecting circuit is disposed in the buffer area and is configured to detect quality of the first through hole in the display panel. The connecting line is formed in the touch layer and is configured to connect the detecting circuit to an external circuit. By designing the detecting circuit that introduces the external circuit from the touch layer into an internal side of the display panel, quality of an area where the through hole is defined can be detected so as to detect defects such as damage and cracks in time, thereby preventing display devices with a failed panel from proceeding to later processes and improving product yield.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Figure 1:
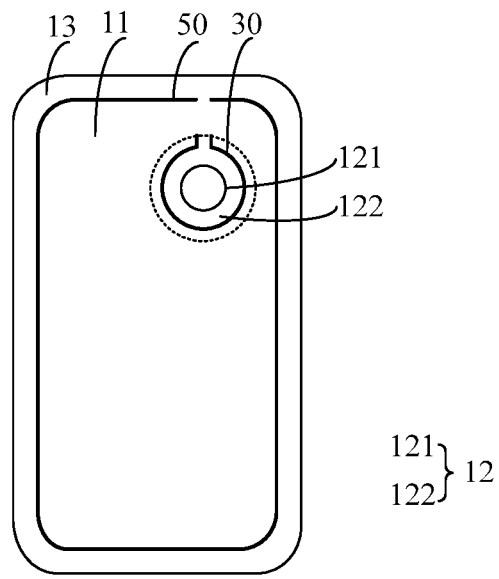
FIG. 1 is a structural schematic view showing a display panel and a detecting circuit in a display device provided by an embodiment of the present disclosure.

The following description of the various embodiments is provided with reference to the accompanying drawings to demonstrate that the embodiments of the present disclosure may be implemented. It should be understood that terms such as "upper," "lower," "front," "rear," "left," "right," "inside," "outside," "lateral" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In the drawings, the identical or similar reference numerals constantly denote the identical or similar elements or elements having the identical or similar functions.

The present disclosure provides a display device and a terminal to alleviate a technical problem that quality of an area where a hole is defined needs to be detected.

The present disclosure provides a display device and a terminal. The display device includes a display panel, a touch layer, a detecting circuit, and a connecting line. The display panel includes a display area and an electronic component area where a plurality of electronic components are correspondingly disposed. The electronic component area includes a first through hole and a buffer area, and the buffer area surrounds the first through hole and is in contact with the display area. The touch layer is provided with a touch electrode, and a second through hole is defined in an area of the touch layer corresponding to the first through hole. The detecting circuit is disposed in the buffer area and is configured to detect quality of the first through hole in the display panel. The connecting line is formed in the touch layer and is configured to connect the detecting circuit to an external circuit.

Figure 2:
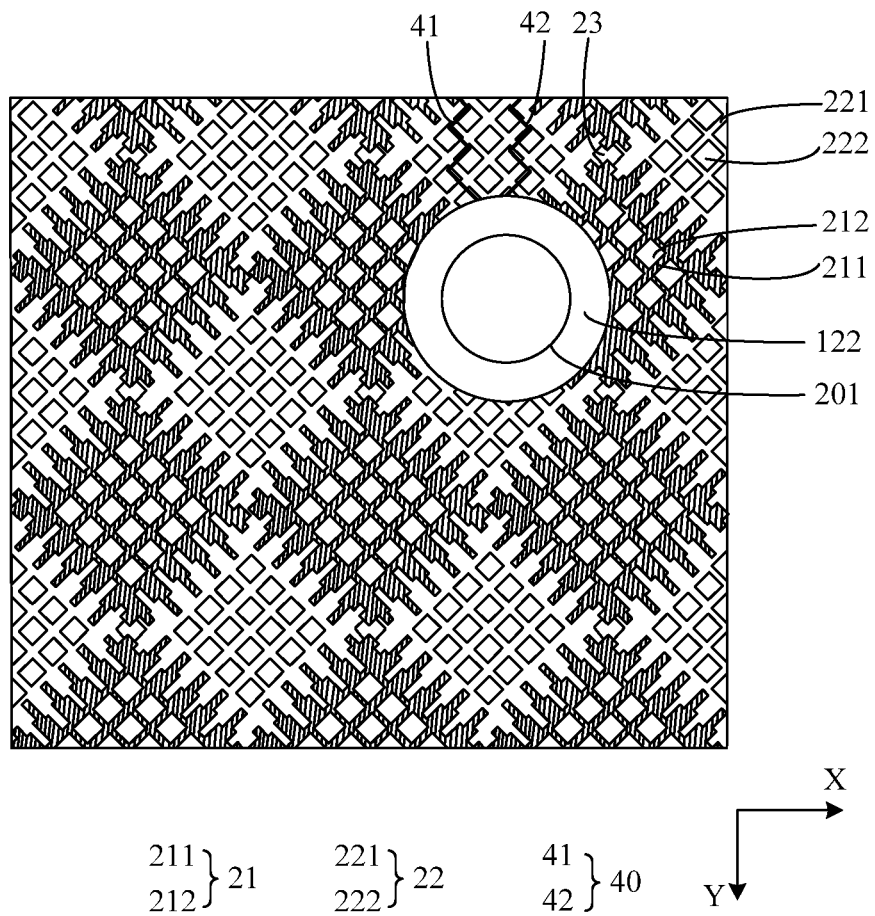
FIG. 2 is a structural schematic view showing a touch layer and a connecting line in the display device provided by the embodiment of the present disclosure.
Figure 3:
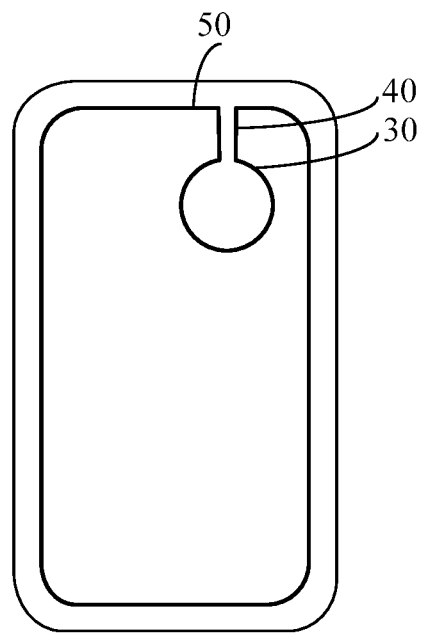
FIG. 3 is a schematic view showing a connection between a detecting circuit and an external circuit in the display device provided by the embodiment of the present disclosure.

FIG. 1 is a schematic structural view showing a detecting circuit and a display panel in a display device provided by the present embodiment. FIG. 2 is a schematic structural view showing a touch layer and a connecting line in the display device provided by the present embodiment. FIG. 3 is a schematic view showing a connection between a detecting circuit 30 and an external circuit 50. Specifically, the display device provided by the present disclosure is described below in conjunction with FIG. 1 to FIG. 3.

As shown in FIG. 1, the display panel includes a display area 11 and an electronic component area 12 where a plurality of electronic components are disposed. The electronic component area 12 includes a first through hole 121 and a buffer area 122. The buffer area 122 surrounds the first through hole 121 and is in contact with the display area 11. The detecting circuit 30 is disposed in the buffer area 122 and is configured to detect quality of the first through hole 121 in the display panel.

With development of full-screen technology, disposing electronic components, such as camera lenses, under a display panel has become a growing trend. Correspondingly, a hole must be defined on the display panel so that electronic components can be disposed therein. An area where the hole is defined is the electronic component area 12, and the hole is the first through hole 121.

In conventional technology, an area where the through hole 121 is defined is prone to destructive defects such as damage and cracks, resulting in panel failure. If later processes of the display panel proceed, product yield will be affected. As a result, the present disclosure provides the detecting circuit 30 which is connected to the external circuit 50 by a connecting line 40 and is configured to detect the first through hole 121, thereby allowing information about quality of the first through hole 121 to be obtained in a timely manner in order to detect and deal with damaged display panels.

As shown in FIG. 1, the buffer area 122 is disposed outside the first through hole 121, around the first through hole 121, and in contact with the display area 11. That is, the buffer area 122 is ring-shaped. The detecting circuit 30 is disposed in the buffer area 122 and may also be disposed around the first through hole 121.

The external circuit 50 may be disposed at an interface between the display area 11 and a non-display area 13 as shown in FIG. 1 or may be disposed in the non-display area 13. As shown in FIG. 3, the connecting line 40 includes a first connecting line 41 and a second connecting line 42, and the detecting circuit 30 is connected to the external circuit 50 by the first connecting line 41 and the second connecting line 42.

The external circuit 50 is configured to transfer signals to the detecting circuit 30. There are two methods of detection. First, directly detect changes in resistance of the detecting circuit 30 to confirm defects such as cracks and damage in the hole. Second, connect the detecting circuit 30 to an internal side of the display panel and then check an image displayed by the display panel to confirm defects.

The connecting line 40 is formed in the touch layer and is configured to connect the detecting circuit 20 to the external circuit 50. As shown in FIG. 2, it is a schematic structural view showing the touch layer and the connecting line in the display device provided by the present embodiment. The touch layer is provided with a touch electrode, a second through hole 201 is defined in an area of the touch layer corresponding to the first through hole 121, and an area which surrounds the second through hole 201 is also the buffer area 122.

The detecting circuit 30 is formed in the buffer area 122 of the display panel. Therefore, no pixel is disposed in the buffer area 122 or a virtual pixel is disposed in the buffer area 122, and a touch electrode is also not disposed in the buffer area 122 in a corresponding touch layer. A special film may be disposed in the buffer area 122 in the touch layer, for example, an optically clear adhesive (OCA) layer.

When forming the second through hole 201, first the touch electrode is formed, and then the second through hole 201 is defined in an area corresponding to the first through hole 121. A size of the second through hole 201 is equal to or greater than a size of the first through hole 121. When the second through hole 201 is defined, a portion of the touch electrode is cut.

The display panel provided by the present disclosure may be an organic light-emitting diode (OLED) display panel or a liquid crystal display (LCD) panel. When the display panel is the OLED display panel, the touch layer is disposed on a light-emitting side of the display panel. When the display panel is the LCD panel, to integrate the touch layer with the display panel, an on-cell method and an in-cell method are usually used to realize a touch control function of a display device. The on-cell method is to embed the touch layer on the light-emitting side of the display panel, while the in-cell method is to embed the touch layer into the display panel. However, types of the display panel and relative positions between the touch layer and the display panel are not limited to the present disclosure.

The touch layer may be a self-capacitance touch layer or a mutual capacitance touch layer. In the present disclosure, the touch electrode is the self-capacitance and includes a first touch electrode 21 and a second touch electrode 22. The touch layer includes a first touch layer and a second touch layer which are stacked, the first touch layer is provided with a plurality of first touch electrode chains arranged along a first direction X and a plurality of second touch electrode chains arranged along a second direction Y, and the first direction X is perpendicular to the second direction Y. The first touch electrode chains include the plurality of first touch electrodes 21 connecting to each other, and the second touch electrode chains include the plurality of second touch electrodes 22 independent from each other. The second electrode layers 22 form a plurality of connecting bridges 23, two adjacent second touch electrodes 22 are connected by the connecting bridges 23 in the second touch electrode chains, and the connecting line 40 is formed in at least one of the first touch layer or the second touch layer.

The first touch electrode 21 is a driving electrode, and the second touch electrode 22 is a sensing electrode. Alternatively, the first touch electrode 21 is a sensing electrode, and the second touch electrode 22 is a driving electrode.

As shown in FIG. 2, both the first touch electrode 21 and the second touch electrode 22 are formed in the first touch layer and have a rhombic shape, wherein the first touch electrode 21 and the second touch electrode 22 are insulated from each other.

In the present embodiment, for the sake of illustration, the first direction X is horizontal, and the second direction Y is vertical. The first touch electrodes 21 are vertically connected to form the first touch electrode chains, every two adjacent first touch electrodes 21 in the first touch electrode chains are directly connected, and the first touch electrode chains are arranged along a horizontal direction. The second touch electrodes 22 are horizontally arranged to form the second touch electrode chains, every two adjacent second touch electrodes 22 in the second touch electrode chains are not in contact with each other, and the second touch electrodes are arranged along a vertical direction. Finally, the first touch electrodes 21 and the second touch electrodes 22 are arranged in a criss-cross manner, that is, each of the first touch electrodes 21 is surrounded by four second touch electrodes 22, and each of the second touch electrodes 22 is surrounded by four first touch electrodes 21.

The second touch layer is disposed on the first touch layer and is patterned to form the connecting bridges 23, and every two adjacent second touch electrodes 22 in each of the second touch electrode chains are connected by the connecting bridges 23. It should be noted that positions on the first touch layer where projections of connecting bridges 23 are located are positions where two adjacent first touch electrodes 21 of the first touch electrode chains are connected. Therefore, lines at the positions where two adjacent first touch electrodes 21 are connected are not shown in FIG. 2 because they are blocked by the connecting bridges 23.

When the display device is turned on, the plurality of first touch electrodes 21 are electrically connected along the second direction Y, and the plurality of second touch electrodes 22 are electrically connected along the first direction X. Because the first touch electrodes 21 and the second touch electrodes 22 need to be insulated from each other, the second touch electrodes 22 are independent from each other in the first touch layer and do not cross the first touch electrode chains. Specifically, the connecting bridges 23 are formed in the second touch layer, and two adjacent second touch electrodes are horizontally electrically connected by the connecting bridges 23. An insulating layer is disposed between the first touch layer and the second touch layer, and the connecting bridges 23 are connected to two adjacent second touch electrodes 22 by a through hole located in the insulation layer. The insulating layer is made of silicon nitride by plasma enhanced chemical vapor deposition.

The connecting line 40 passes through the touch layer and connects the detecting circuit 30 and the external circuit 50. The connecting line 40 may be formed in the first touch layer, may be formed in the second touch layer, or may be disposed in both the first touch layer and the second touch layer.

Both the first touch electrodes 21 and the second touch electrodes 22 are rhombic. In one embodiment, as shown in FIG. 2, both the first touch electrodes 21 and the second touch electrodes 22 have grid shaped. The first touch electrodes 21 include a plurality of first electrode lines 211 arranged in a criss-cross manner, and the second touch electrodes 22 include a plurality of second electrode lines 221 arranged in a criss-cross manner. The first electrode lines 211 cross each other to form a plurality of first virtual units 212, the second electrode lines 221 cross each other to form a plurality of second virtual units 222, and the first virtual units 212 and the second virtual units 222 are transparent. Light transmittance of a touch electrode having a grid shape may be improved.

In one embodiment, a material of the connecting line 40 is same as materials of the first electrode lines 211 and the second electrode lines 221.

When the materials of the first electrode lines 211 and the second electrode lines 221 are transparent conductors such as indium tin oxide (ITO), nanosilver, and carbon nanotubes. the connecting line 40 is also made of the transparent conductors such as indium tin oxide (ITO), nanosilver, and carbon nanotubes. When the first electrode lines 211 and the second electrode lines 221 are non-transparent conductors such as Ti/Al/Ti stacked layers, Ti/Cu/Ti stacked layers, Mo/Al/Mo stacked layers, and Mo/Cu/Mo stacked layers, the connecting line 40 is also the non-transparent conductor such as a Ti/Al/Ti stacked layer, a Ti/Cu/Ti stacked layer, a Mo/Al/Mo stacked layer, and a Mo/Cu/Mo stacked layer.

In one embodiment, the connecting line 40 and the external circuit 50 are connected by at least one of the first virtual units 212 or the second virtual units 222. By the virtual units, contact areas between the connecting line 40 and the first electrode lines 211 and contact areas between the connecting line 40 and the second electrode lines 221 may be reduced as much as possible, thereby reducing impact on a touch control function.

Figure 4:
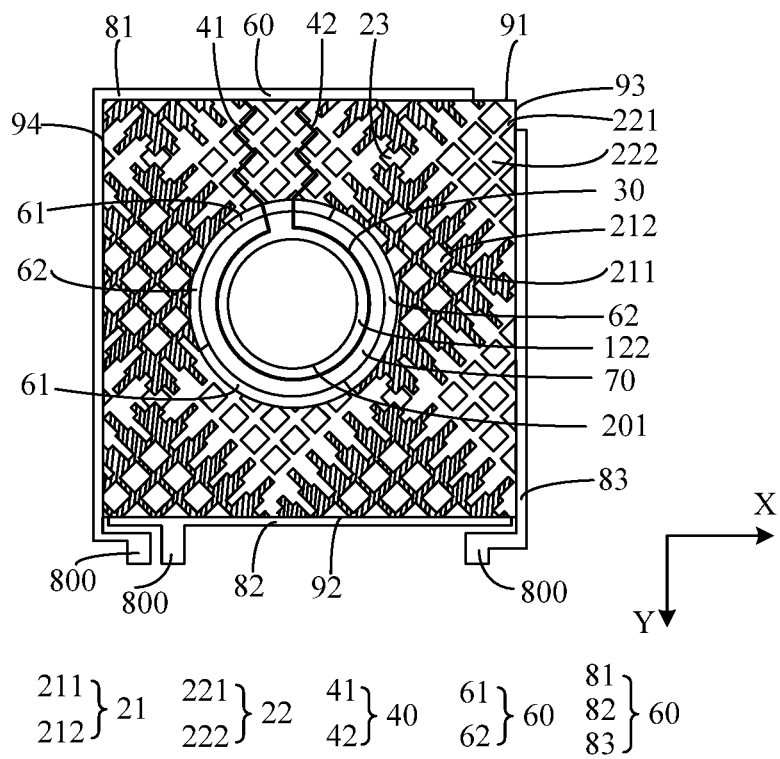
FIG. 4 is a schematic structural view showing the display device provided by the embodiment of the present disclosure.

As shown in FIG. 4, a schematic enlarged partial view of FIG. 2 is shown. The connecting line 40 is correspondingly disposed with respect to the second touch electrodes 22 and is connected to the external circuit 50 by the second virtual units 222. The connecting line 40 may be a polyline or a straight line.

In one embodiment, in the buffer area 122, the second touch layer is provided with a first conduction line 60 disposed around the detecting circuit 30, and the first conduction line 60 includes a first touch electrode conduction line 61 and a second touch electrode conduction line 62. The first electrode lines 211 of the first touch electrodes 21 disconnected by the buffer area 122 are reconnected by the first touch electrode conduction line 61, and the second electrode lines 221 of the second touch electrodes 22 disconnected by the buffer area 122 are reconnected by the second touch electrode conduction line 62.

Because the buffer area 122 is disposed in the display panel, the first touch electrodes 21 and the second touch electrodes 22 may be disconnected by the buffer area 122. That is, both the first touch electrodes 21 and the second touch electrodes 22 lose a part of themselves and are no longer complete. When the touch layer is touched, the first touch electrodes 21 need to be electrically connected along the second direction Y, and the second touch electrodes 22 need to be electrically connected along the first direction X. However, because the touch electrodes are disconnected by the buffer area 122, the first conduction line 60 must be disposed to reconnect each of the touch electrodes.

Because the buffer area 122 is ring-shaped and the first conduction line 60 is disposed around the detecting circuit 30, the first conduction line 60 is also ring-shaped. That is, both the first touch electrode conduction line 61 and the second touch electrode conduction line 62 are ring-shaped. Because the first touch electrodes 21 and the second touch electrodes 22 are insulated, the first touch electrode conduction line 61 and the second touch electrode conduction line 62 are insulated as well. That is, the first conduction line 60 are formed by a plurality of arcs that are not connected. Because the first touch electrodes 21 and the second touch electrodes 22 are disposed on the first touch layer and the first touch electrode conduction line 61 and the second touch electrode conduction line 62 are disposed on the second control layer, the first touch electrode conduction line 61 and the second touch electrode conduction line 62 are respectively connected to corresponding first touch electrodes 21 and corresponding second touch electrodes 22 by through holes.

In one embodiment, a material of the first conduction line 60 is same as the materials of the first electrode lines 211 and the second electrode lines 221.

When the materials of the first electrode lines 211 and the second electrode lines 221 are transparent conductors such as indium tin oxide (ITO), nanosilver, and carbon nanotubes. the first conduction line 60 is also made of the transparent conductors such as indium tin oxide (ITO), nanosilver, and carbon nanotubes. When the first electrode lines 211 and the second electrode lines 221 are non-transparent conductors such as Ti/Al/Ti stacked layers, Ti/Cu/Ti stacked layers, Mo/Al/Mo stacked layers, and Mo/Cu/Mo stacked layers, the first conduction line 60 is also the non-transparent conductor such as a Ti/Al/Ti stacked layer, a Ti/Cu/Ti stacked layer, a Mo/Al/Mo stacked layer, and a Mo/Cu/Mo stacked layer.

In one embodiment, in the buffer area 122, the second touch layer is further provided with a second conduction line 70 located between the first conduction line 60 and the detecting circuit 30, the first virtual units 212 disconnected by the buffer area 122 are reconnected by the second conduction line 70, and the second virtual units 222 disconnected by the buffer area 122 is reconnected by the second conduction line 70.

In one embodiment, a material of the second conduction line 70 is same as the materials of the first virtual units 212 and the second virtual units 222.

Because the first touch layers 21 and the second touch layers 22 are disposed on the first touch layer and the second conduction line 70 is disposed on the second control layer, the second conduction line 70 is connected to corresponding first virtual units 212 and corresponding second virtual units 222 by a through hole.

In one embodiment, as shown in FIG. 4, the touch layer includes a first edge 91 and a second edge 92 which are parallel to the first direction X and a third edge 93 and a fourth edge 94 which are parallel to the second direction Y. The display device further includes an electrode signal line 80 disposed along an edge of the touch layer. The electrode signal line 80 includes a first electrode signal line 81, a second electrode signal line 82, and a third signal line 83. The first electrode signal line 81 is disposed along the first edge 91 and the fourth edge 94 and is connected to the first touch electrode chains at the first edge 91, the second electrode signal line 82 is disposed along the second edge 92 and is connected to the first touch electrode chains, the third electrode signal line 83 is disposed along the third edge 93 and is connected to the second touch electrode chains. The first electrode signal line 81, the second electrode signal line 82, and the third electrode signal line 83 are respectively connected to a signal terminal 800 at the second edge 92.

In FIG. 4, the first direction X is horizontal and is a transfer direction of signals of the second touch electrodes 22; the second direction Y is vertical and is a transfer direction of signals of the first touch electrodes 21. Both the first electrode signal line 81 and the second electrode line 82 are connected to the first touch electrode chains. That is, the first electrode signal line 81 and the second electrode signal line 82 simultaneously drive the first touch electrodes 21 so that signals of the first touch electrodes 21 can be vertically transferred, wherein a driving method is a double-sided driving method. The third electrode signal line 83 is connected to the second touch electrode chains, signals of the second control electrodes 22 are horizontally transferred, and a driving method is a single-sided driving method.

The first electrode signal line 81 is disposed along the first edge 91, surrounds the fourth edge 94, and is connected to the signal terminal 800 at the second edge 92, wherein the first electrode signal line 81 is provided with a plurality of connecting points, and each of the connecting points is connected to one of the first touch electrode chains.

The second electrode signal line 82 is disposed along the second edge 92 and is connected to the signal terminal 800 at the second edge 92, wherein the second electrode lines 82 is provided with a plurality of connecting points, and each of the connecting points is connected to one of the first touch electrode chains.

The third electrode signal line 83 is disposed along the third edge 93 and is connected to the signal terminal 800 at the second edge 92, wherein the third electrode line 83 is provided with a plurality of connecting points, and each of the connecting points is connected to one of the second touch electrode chains.

When the touch layer is touched, the external circuit bonds with the signal terminal 800 by a flexible circuit board and then transfers signals to the touch electrodes of the touch layer to realize a touch control function.

In the present embodiment, the first touch electrodes 21 are driving electrodes, and the second touch electrodes 22 are sensing electrodes. To achieve a better touch control effect, a double-sided connecting method is applied to the driving electrodes, and a single-sided connecting method is applied to the sensing electrodes.

In one embodiment, a material of the electrode signal line 80 is same as the materials of the first electrode lines 211 and the second electrode lines 221. When the materials of the first electrode lines 211 and the second electrode lines 221 are transparent conductors such as indium tin oxide (ITO), nanosilver, and carbon nanotubes. the electrode signal line 80 is also made of the transparent conductors such as indium tin oxide (ITO), nanosilver, and carbon nanotubes. When the first electrode lines 211 and the second electrode lines 221 are non-transparent conductors such as Ti/Al/Ti stacked layers, Ti/Cu/Ti stacked layers, Mo/Al/Mo stacked layers, and Mo/Cu/Mo stacked layers, the electrode signal line 80 is also the non-transparent conductor such as a Ti/Al/Ti stacked layer, a Ti/Cu/Ti stacked layer, a Mo/Al/Mo stacked layer, and a Mo/Cu/Mo stacked layer.

In all of the above embodiments, the detecting circuit 30 and the external circuit 50 are disposed in the display panel, and the connecting line 40 is disposed in the touch layer. A through hole is defined in the touch layer and the display panel, and the connecting line 40 is electrically connected to the detecting circuit 30 and the external circuit 50 by the through hole.

In one embodiment, the external circuit 50 may also not be disposed in the display panel, that is, the external circuit 50 is an external circuit. To realize the transfer of signals when the connecting line 40 is connected to the external circuit 50, first form a connecting terminal on the touch layer and then connect the connecting terminal and the external circuit 50.

By forming the connecting line 40 in the touch layer, signals of the external circuit 50 may be transferred to the detecting circuit 30 in the buffer area 122 of the display panel by the connecting line 40 to detect a first through hole 121. Therefore, quality of an area where the through hole 121 is defined can be detected so as to detect and deal with damaged display panels in time. As a result, final product yield can be improved in practical manufacturing processes.

In addition, the present disclosure further provides a terminal, including a display device, wherein the display device includes:

A display panel including a display area and an electronic component area where a plurality of electronic components are correspondingly disposed, the electronic component area includes a first through hole and a buffer area, and the buffer area surrounds the first through hole and is in contact with the display area;

A touch layer, wherein the touch layer is provided with a touch electrode, and a second through hole is defined in an area of the touch layer corresponding to the first through hole;

A detecting circuit, wherein the detecting circuit is disposed in the buffer area and is configured to detect quality of the first through hole in the display panel; and A connecting line, wherein the connecting line is formed in the touch layer and is configured to connect the detecting circuit to an external circuit.

In one embodiment, the touch electrode includes a first touch electrode and a second touch electrode, the touch layer includes a first touch layer and a second touch layer which are stacked, the first touch layer is provided with a plurality of first touch electrode chains arranged along a first direction and a plurality of second touch electrode chains arranged along a second direction, and the first direction is perpendicular to the second direction. The first touch electrode chains include the plurality first touch electrodes connecting to each other, the second touch electrode chains include the plurality of second touch electrodes independent from each other, the second electrode layer is provided with a plurality of connecting bridges, two adjacent second touch electrodes are connected by the connecting bridges in the second touch electrode chains, and the connecting line is formed in at least one of the first touch layer or the second touch layer.

In one embodiment, the connecting line is correspondingly disposed with respect to at least one of the first touch electrode or the second touch electrode.

In one embodiment, the first touch electrode and the second touch electrode are grid shaped, the first touch electrode includes a plurality of first electrode lines arranged in a criss-cross manner, the first electrode lines encircle a plurality of first virtual units, the second touch electrode includes a plurality of second electrode lines arranged in a criss-cross manner, the second electrode lines encircle a plurality of second virtual units, and the connecting line is connected to the external circuit by at least one of the first virtual units or the second virtual units.

In one embodiment, the connecting line is a polyline or a straight line.

In one embodiment, a material of the connecting line is same as materials of the first electrode lines and the second electrode lines.

In one embodiment, the material of the connecting line is at least one of indium tin oxide, nanosilver, or carbon nanotubes.

In one embodiment, the material of the connecting line is at least one of a Ti/Al/Ti stacked layer, a Ti/Cu/Ti stacked layer, a Mo/Al/Mo stacked layer, or a Mo/Cu/Mo stacked layer.

In one embodiment, the connecting line includes a first connecting line and a second connecting line independent from each other, and the detecting circuit is disposed around the first through hole and is connected to the external circuit by the first connecting line and the second connecting line.

In one embodiment, in the buffer area, the second touch layer is provided with a first conduction line disposed around the detecting circuit, the first conduction line includes a first touch electrode conduction line and a second touch electrode conduction line, a plurality of first electrode lines of the first touch electrode disconnected by the buffer area are reconnected by the first touch electrode conduction line, and a plurality of second electrode lines of the second touch electrode disconnected by the buffer area are reconnected by the second touch electrode conduction line.

In one embodiment, a material of the first conduction line is same as the materials of the first electrode lines and the second electrode lines.

In one embodiment, in the buffer area, the second touch layer is further provided with a second conduction line located between the first conduction line and the detecting circuit, a first virtual unit disconnected by the buffer area is reconnected by the second conduction line, and a second virtual unit disconnected by the buffer area is reconnected by the second conduction line.

In one embodiment, a material of the second conduction line is same as materials of the first virtual unit and the second virtual unit.

In one embodiment, the touch layer includes a first edge and a second edge which are parallel to the first direction and a third edge and a fourth edge which are parallel to the second direction. The display device further includes an electrode signal line disposed along an edge of the touch layer; the electrode signal line includes a first electrode signal line, a second electrode signal line, and a third signal line; the first electrode signal line is disposed along the first edge and the fourth edge and is connected to the first touch electrode chains at the first edge; the second electrode signal line is disposed along the second edge and is connected to the first touch electrode chains; and the third electrode signal line is disposed along the third edge and is connected to the second touch electrode chains. The first electrode signal line, the second electrode signal line, and the third electrode signal line are respectively connected to a signal terminal at the second edge.

In one embodiment, a material of the electrode signal line is same as the materials of the first electrode lines and the second electrode lines.

According to the above embodiments, the present disclosure provides a display device and a terminal. The display device includes a display panel, a touch layer, a detecting circuit, and a connecting line. The display panel includes a display area and an electronic component area where a plurality of electronic components are correspondingly disposed. The electronic component area includes a first through hole and a buffer area, and the buffer area surrounds the first through hole and is in contact with the display area. The touch layer is provided with a touch electrode, and a second through hole is defined in an area of the touch layer corresponding to the first through hole. The detecting circuit is disposed in the buffer area and is configured to detect quality of the first through hole in the display panel. The connecting line is formed in the touch layer and is configured to connect the detecting circuit to an external circuit. By designing the detecting circuit that introduces the external circuit from the touch layer into an internal side of the display panel, quality of an area where the through hole is defined can be detected so as to detect defects such as damage and cracks in time, thereby preventing display devices with a failed panel from proceeding to later processes and improving product yield.

To sum up, the present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display device, comprising:
   a display panel comprising a display area and an electronic component area where a plurality of electronic components are correspondingly disposed, the electronic component area comprises a first through hole and a buffer area, and the buffer area surrounds the first through hole and is in contact with the display area;
   a touch layer, wherein the touch layer is provided with a touch electrode, and a second through hole is defined in an area of the touch layer corresponding to the first through hole;
   a detecting circuit, wherein the detecting circuit is disposed in the buffer area and is configured to detect quality of the first through hole in the display panel; and
   a connecting line, wherein the connecting line is formed in the touch layer and is configured to connect the detecting circuit to an external circuit;
   wherein the touch electrode comprises a first touch electrode and a second touch electrode, the touch layer comprises a first touch layer and a second touch layer which are stacked, the first touch layer is provided with a plurality of first touch electrode chains arranged along a first direction and a plurality of second touch electrode chains arranged along a second direction, the first direction is perpendicular to the second direction, the first touch electrode chains comprise the plurality of first touch electrodes connecting with each other, the second touch electrode chains comprise the plurality of second touch electrodes independent from each other, the second electrode layer is provided with a plurality of connecting bridges, two adjacent second touch electrodes are connected by the connecting bridges in the second touch electrode chains, and the connecting line is formed in at least one of the first touch layer or the second touch layer;
   the connecting line comprises a first connecting line and a second connecting line independent from each other, and the detecting circuit is disposed around the first through hole and is connected to the external circuit by the first connecting line and the second connecting line; and
   in the buffer area, the second touch layer is provided with a first conduction line disposed around the detecting circuit, the first conduction line comprises a first touch electrode conduction line and a second touch electrode conduction line, a plurality of first electrode lines of the first touch electrode disconnected by the buffer area are reconnected by the first touch electrode conduction line, and a plurality of second electrode lines of the second touch electrode disconnected by the buffer area are reconnected by the second touch electrode conduction line.

2. The display device of claim 1, wherein the connecting line is correspondingly disposed with respect to at least one of the first touch electrode or the second touch electrode.

3. The display device of claim 2, wherein the first touch electrode and the second touch electrode are grid shaped, the first touch electrode comprises a plurality of first electrode lines arranged in a criss-cross manner, the plurality of first electrode lines encircle a plurality of first virtual units, the second touch electrode comprises a plurality of second electrode lines arranged in a criss-cross manner, the second electrode lines encircle a plurality of second virtual units, and the connecting line is connected to the external circuit by at least one of the first virtual units or the second virtual units.

4. The display device of claim 3, wherein the connecting line is a polyline or a straight line.

5. The display device of claim 3, wherein a material of the connecting line is same as materials of the first electrode lines and the second electrode lines.

6. The display device of claim 5, wherein the material of the connecting line is at least one of indium tin oxide, nanosilver, or carbon nanotubes.

7. The display device of claim 5, wherein the material of the connecting line is at least one of a Ti/Al/Ti stacked layer, a Ti/Cu/Ti stacked layer, a Mo/Al/Mo stacked layer, or a Mo/Cu/Mo stacked layer.

8. The display device of claim 3, wherein the touch layer comprises a first edge and a second edge which are parallel to the first direction, and a third edge and a fourth edge which are parallel to the second direction, the display device further comprises an electrode signal line disposed along an edge of the touch layer, the electrode signal line comprises a first electrode signal line, a second electrode signal line, and a third electrode signal line, the first electrode signal line is disposed along the first edge and the fourth edge and is connected to the first touch electrode chains at the first edge, the second electrode signal line is disposed along the second edge and is connected to the first touch electrode chains, the third electrode signal line is disposed along the third edge and is connected to the second touch electrode chains, and the first electrode signal line, the second electrode signal line, and the third electrode signal line are respectively connected to a signal terminal at the second edge.

9. The display device of claim 8, wherein a material of the electrode signal line is same as materials of the first electrode lines and the second electrode lines.

10. The display device of claim 1, wherein a material of the first conduction line is same as materials of the first electrode lines and the second electrode lines.

11. The display device of claim 1, wherein in the buffer area, the second touch layer is further provided with a second conduction line located between the first conduction line and the detecting circuit, a first virtual unit disconnected by the buffer area is reconnected by the second conduction line, and a second virtual unit disconnected by the buffer area is reconnected by the second conduction line.

12. The display device of claim 11, wherein a material of the second conduction line is same as materials of the first virtual unit and the second virtual unit.

13. A terminal, comprising a display device;
    wherein the display device comprises:
    a display panel comprising a display area and an electronic component area where a plurality of electronic components are correspondingly disposed, the electronic component area comprises a first through hole and a buffer area, and the buffer area surrounds the first through hole and is in contact with the display area;
    a touch layer, wherein the touch layer is provided with a touch electrode, and a second through hole is defined in an area of the touch layer corresponding to the first through hole;
    a detecting circuit, wherein the detecting circuit is disposed in the buffer area and is configured to detect quality of the first through hole in the display panel; and
    a connecting line, wherein the connecting line is formed in the touch layer and is configured to connect the detecting circuit to an external circuit;
    wherein the touch electrode comprises a first touch electrode and a second touch electrode, the touch layer comprises a first touch layer and a second touch layer which are stacked, the first touch layer is provided with a plurality of first touch electrode chains arranged along a first direction and a plurality of second touch electrode chains arranged along a second direction, the first direction is perpendicular to the second direction, the first touch electrode chains comprise the plurality of first touch electrodes connecting with each other, the second touch electrode chains comprise the plurality of second touch electrodes independent from each other, the second electrode layer is provided with a plurality of connecting bridges, two adjacent second touch electrodes are connected by the connecting bridges in the second touch electrode chains, and the connecting line is formed in at least one of the first touch layer or the second touch layer;

the connecting line comprises a first connecting line and a second connecting line independent from each other, and the detecting circuit is disposed around the first through hole and is connected to the external circuit by the first connecting line and the second connecting line; and in the buffer area, the second touch layer is provided with a first conduction line disposed around the detecting circuit, the first conduction line comprises a first touch electrode conduction line and a second touch electrode conduction line, a plurality of first electrode lines of the first touch electrode disconnected by the buffer area are reconnected by the first touch electrode conduction line, and a plurality of second electrode lines of the second touch electrode disconnected by the buffer area are reconnected by the second touch electrode conduction line.

14. The terminal of claim 13, wherein the connecting line is correspondingly disposed with respect to at least one of the first touch electrode or the second touch electrode.

15. The terminal of claim 14, wherein the first touch electrode and the second touch electrode are grid shaped, the first touch electrode comprises a plurality of first electrode lines arranged in a criss-cross manner, the first electrode lines encircle a plurality of first virtual units, the second touch electrode comprises a plurality of second electrode lines arranged in a criss-cross manner, the second electrode lines encircle a plurality of second virtual units, the connecting line is connected to the external circuit by at least one of the first virtual units or the second virtual units.

16. The terminal of claim 15, wherein the connecting line is a polyline or a straight line.

* * * * *